March 25, 1969     A. P. ZASKE     3,434,341
CARBURETOR TEST EQUIPMENT
Filed July 28, 1966
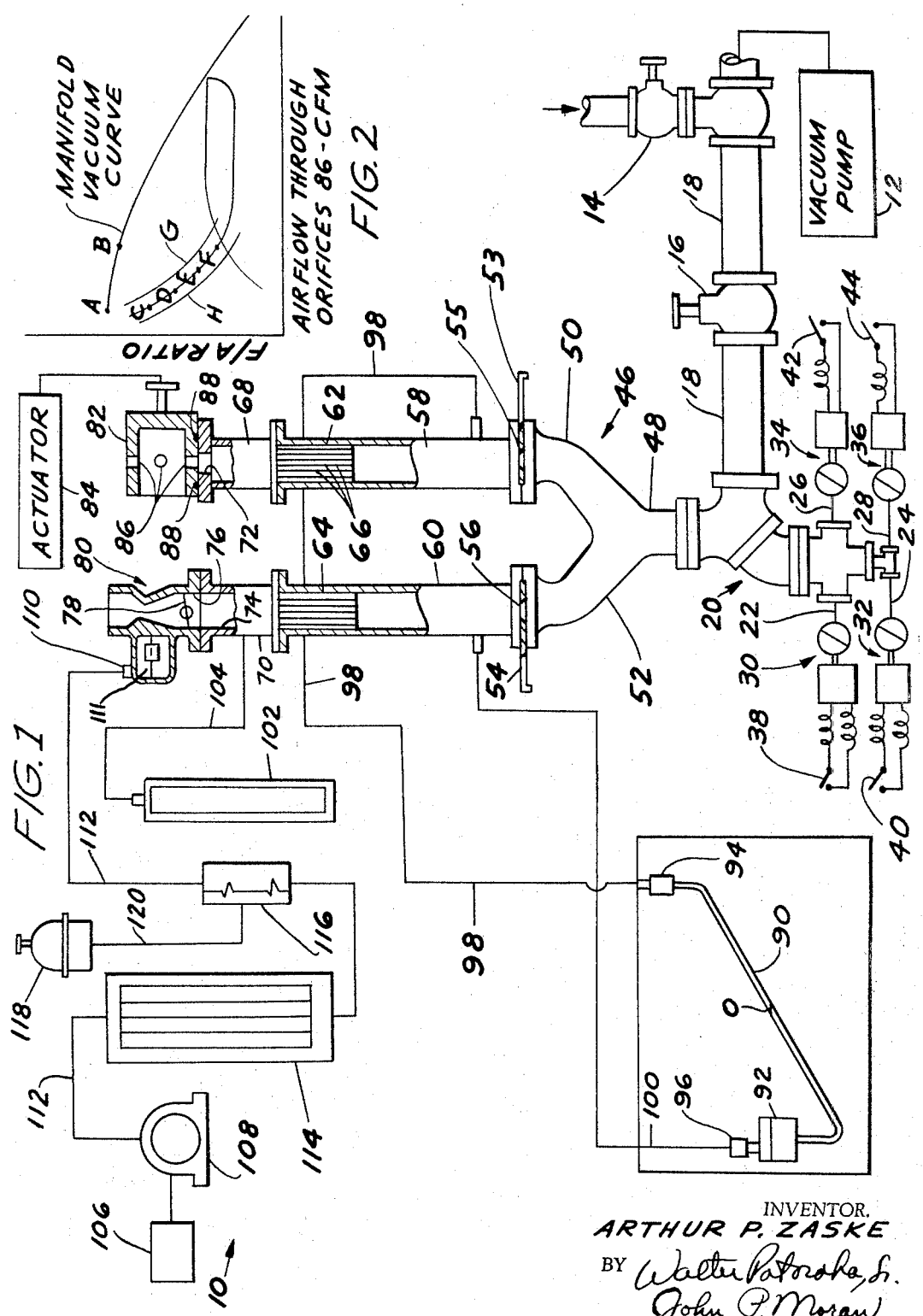
INVENTOR.
ARTHUR P. ZASKE
BY Walter Patroha, Jr.
John P. Moran
ATTORNEYS United States Patent Office 3,434,341
Patented Mar. 25, 1969

3,434,341
CARBURETOR TEST EQUIPMENT
Arthur P. Zaske, Utica, Mich., assignor to Holley Carburetor Company, Warren, Mich., a corporation of Michigan
Filed July 28, 1966, Ser. No. 568,669
Int. Cl. G01m 15/00
U.S. Cl. 73—118                                    8 Claims

ABSTRACT OF THE DISCLOSURE

Typically, an apparatus for flow testing carburetors employs a first chamber-like passage connected at one end to the discharge end of the carburetor induction passage and connected at its opposite end to a branch of a Y-type conduit; a master having pre-calibrated orifices is operatively connected to one end of a second chamber-like passage having its other end connected to another branch of the Y-type conduit, with the master being so positioned as to have one of the calibrated orifices in communication with the second chamber-like passage; a vacuum pump is operatively connected to the remaining branch of the Y-type conduit and is effective for creating at selected values of vacuum within the two chamber-like passages; and gauging means responsive to the flow rate of a simulated fuel fluid are provided for indicating the rate of flow of such simulated fuel fluid during the time that a selected vacuum value has been established in the two chamber-like passages.

---

This invention relates generally to test equipment, and more particularly to carburetor test equipment.

In view of the current increased interest in reducing automotive exhaust emissions, and in further view of recent and proposed legislation on this subject, it has become essential that carburetor design and performance specifications be held within relatively close tolerances. In order to meet these tolerances, it is necessary that the various testing and inspection procedures be updated and that new testing techniques be employed.

One of the important characteristics relative to the so-called "emission control carburetor" concerns air flow in cubic feet per minute (c.f.m.) vis. the fuel-air ratio (F/A) during idle and "off-idle" engine operation, and the fuel-air ratio for each of several selected air flows must be held within a relatively close tolerance range. While various carburetor manufacturing techniques may be employed to attain a result within this range, testing of such carburetors on heretofore known equipment is quite unsatisfactory and inefficient. For example, in a typical prior art test system, a master carburetor known to meet specifications would first be used to establish several points on an inclined manometer. The master carburetor would then be removed and each carburetor of a production run would be checked against each of the several established points. However, if atmospheric or other conditions change, some degree of error will be introduced into the test results.

Accordingly, a primary object of the invention is to provide test equipment which will quickly and accurately determine the above mentioned c.f.m=F/A relationship in a manner which vertually eliminates inherent errors.

Another object of the invention is to provide such test equipment which includes a multiple station master orifice assembly for checking several specific predetermined points within the designated idle or off-idle range for any run of production carburetors.

A further object of the invention is to provide such test equipment wherein a varying vacuum supply does not result in unstable air flow measurement indications.

A still further object of the invention is to provide such test equipment wherein there can be no instability resulting from varying atmospheric conditions or from any other reason.

Still another object of the invention is to provide such test equipment wherein a shorter, larger diameter inclined manometer may be used, resulting in more accurate resolution.

Other objects and advantages of the invention will become more apparent when reference is made to the following specification in the accompanying drawings wherein:

FIGURE 1 is a schematic illustration of test apparatus embodying the invention.

FIGURE 2 is a graphic representation of carburetor performance that can be tested by use of the apparatus shown in FIGURE 1.

Referring now to FIGURE 1 in greater detail, test apparatus 10 embodying the invention includes any suitable vacuum pump 12 having means, such as balancing valves 14 and 16 or the like, for simulating a given manifold vacuum curve when used in conjunction with an air source to be explained.

The apparatus 10 further includes a conduit 18 communicating between the vacuum pump 12 and the balancing valves 14 and 16 to a plurality of fittings 20 for permitting the flow of air from any one of four conduits 22, 24, 26 and 28, each of which is controlled by a solenoid operated valve 30, 32, 34 and 36, respectively, the latter being energized by associated electrical switches 38, 40, 42 and 44, respectively, and a power source (not shown), for a purpose to be described.

A Y-type connector 46, which includes a trunk 48 and branches or legs 50 and 52, communicates between the fittings 20 and a pair of plates 53 and 54 including identical sharp edged orifices 55 and 56, respectively. The plates 53 and 54 are confined between the legs 50 and 52 and a pair of double flanged tubular members 58 and 60, respectively. Each of the members 58 and 60 includes, at a predetermined distance from the orifices 55 and 56, a pair of so-called "air straighteners" 62 and 64, which may comprise a plurality of small diameter stacked tubes 66 or other suitable structure.

Tubular mounting bases 68 and 70 are secured to the ends of the tubular members 58 and 60, respectively, preferably adjacent the straighteners 62 and 64. The base 68 consists of a double flanged tubular member having an opening 72 formed in the end thereof opposite the member 58, while the base 70 consists of an unrestricted double flanged tubular member, The passage 74 is substantially the same diameter as the induction passage 76 of the production carburetor 80, in which the usual throttle plate 78 is pivotally mounted and which is to be tested. The carburetor 80 is mounted on the base 70 so that flow through the induction passage 76, as controlled by movement of the throttle plate 78, will determine the air flow through the passages 74, 66 and 60 and the orifice 56 to the leg 52.

A manually controlled rotatable multiple station master orifice 82 is mounted on the mounting base 68 adjacent the unrestricted opening 72. While a four station master 82 is shown, any desired number of stations may be provided, depending upon the number of air flow rates to be checked. A suitable actuator assembly 84 is connected to the master orifice 82 in order to provide means for indexing the master orifice and aligning some one of its four different sized orifices 86 with the unrestricted opening 72. Once a particular orifice 86 is aligned with the opening 72, seals 88 prevent leakage between the members 82 and 68.

An inclined manometer 90, including a reservoir 92 preferably containing a suitably colored fluid, has the ends thereof 94 and 96 connected via two conduits 98 and 100 into the members 58 and 60, respectively, in order to sense the pressures therein and determine when the flows therethrough are equal. A vertical manometer 102 is connected between the conduit 100 and the passage 74 of the member 70 in a line 104 for a purpose to be described.

A source of fuel 106 and a fuel pump 108 supply gasoline (or simulated liquid fuel) to a fuel inlet valve 110 at the inlet to the float chamber 111 of the carburetor 80 via a fuel line 112. A rotameter 114, which is well known in the art, is connected in the fuel line 112 in order to indicate the amount of fuel flowing therethrough. A pressure regulator 116, which receives air from an air pressure source 118 via a line 120, is also mounted in the fuel line 112, for the purpose of establishing a desired carburetor 80 fuel inlet pressure.

*Operation*

At the outset, the test apparatus 10 must be set up so that some given engine manifold vacuum curve is simulated. This may be done by fitting in the opening 74 of the tubular base 70 on which the production carburetors 80 will ultimately be mounted for testing, an orifice having the same flow capacity as the particular orifice 86 of the four-way master 82 which permits the lowest c.f.m., air flow. The balance valve 14 is then adjusted until the desired manifold vacuum, say 19″ Hg, is read on the manometer 102. This is equivalent to point A on the manifold vacuum curve of FIGURE 2. The fourway master 82 is then indexed to align the orifice 86 which permits the highest c.f.m., air flow through the system and a second orifice with the same flow capacity is fitted into the opening 74. The second balance valve 16 is then adjusted until the desired lower manifold vacuum reading is indicated on the manometer 102. The latter reading would be equivalent to point B on the same curve. The higher manifold vacuum reading may then be rechecked and readjusted if necessary.

With the given manifold vacuum curve simulation established, the calibrating orifice in opening 74 is then removed and a production carburetor 80 mounted thereon. The fuel flow connection is made between the fuel line 112 and the fuel inlet valve 110. The four-way master orifice element 82 is then indexed to align the lowest c.f.m. air flow orifice 86 with the opening 72. It should be explained that each of the orifices 86 is designed with critical flow characteristics, in effect making each orifice 86 a sonic nozzle.

Closing the switch 38 to energize the solenoid actuated valve 30 causes the appropriate outlet of the fitting 20 to be communicated to atmosphere, constituting an air bleed into the system. This particular bleed opening, together with the particular orifice 86 of the four-way station 82 and throttle 78 setting, are used to adjust the proper total amount of air being pulled through the line 18 by the vacuum pump 12. The other valves 32, 34 and 36 control progressively smaller bleed openings are progressively larger orifices 86 are subsequently indexed into alignment with the opening 72. Should the vacuum supply vary, or should atmospheric conditions change, both the carburetor 80 and the orfice 86 are affected by the same instability factor, and such instability is cancelled out in the Y conduit arrangement.

With the throttle plate 78 closed, the fluid in the inclined manometer 90 will be off center, center having been previously designated by a mark, such as O, in a manner well known in the art. The throttle plate 78 is then manually opened until the fluid level reaches point O, at which time the fuel flow through the carburetor in lbs./hr. is read on the rotameter 114. With air being drawn through the right side 50 of the Y connector and a fuel-air mixture being drawn through the left side 52 thereof, by the vacuum pump 12, the known c.r.m. value of the particular orifice 86 and the corresponding fuel flow reading on the rotameter 114 will determine a calculated point, such as point C of FIGURE 2, the F/A ratio increments of FIGURE 2 being readily determinable since both the fuel and air flows are known.

While the orifices 55 and 56 are substantially identical, the orifice 56 may be designed some slight amount larger than the orifice 55 to compensate for the portion of the area thereacross which is taken up by fuel in the fuel-air mixture.

The operation explained above will be repeated each time that the master orifice 82 is indexed to the next critical flow orifice 86. It is in this manner that the four points C, D, E and F (FIGURE 2) on the carburetor idle and off-idle curve of FIGURE 2 are determined. The requirements are that each of these points must fall between a pair of given curves G and H, which have been previously established as the limits acceptable under emission control regulations. Assuming all four points are within the limiting curve, the carburetor 80 in question is acceptable. However, should any one of the four points fall outside the limits of representative curves G and H, then that particular carburetor 80 is not acceptable.

Each carburetor 80 from the total production lot may be checked against the four or any other specified number of orifices 86 in the manner described above in order to assure that the idle and/or off-idle fuel-air ratio characteristics thereof are acceptable.

It should be apparent that the invention provides a novel and accurate apparatus for checking any number of points on a carburetor fuel-air ratio vs. air flow curve. That is, master 82 obviously could include any desired number of orifices 86.

While the use of a readily indexible multiple station master orifice is convenient and relatively fast, obviously a master actual carburetor with a plurality of previously determined throttle plate positions could be used in lieu of the orifice master.

It will be apparent to those skilled in the art, in view of the well known flow formula, $Q=AV$, that the flow area 86 need not be on a 1 to 1 ratio with the flow area of the carburetor being tested. In other words, $Q=AV$ and $$\frac{Q}{10}=\frac{A}{10}\times V$$

may represent flows through the carburetor 80 being tested and its branch components, including orifice 56, and the master orifice 86 and its branch components, including orifice 55, respectively, indicating that for practical purposes the velocities therethrough the two routes are still the same, regardless of the relative areas of the orifices 55 and 56.

It should also be apparent that the "Y-flow" technique, which utilizes a master orifice throughout the tests, eliminates any instabiliy or fluctuations in the system resulting from such factors as a varying vacuum supply or varying atmospheric condition. It should be further apparent that since only one point O on the inclined manometer is pertinent, the manometer 90 may not only be shorter than prior units whereon some four different check points throughout its length are necessary, but may also be larger in cross-section, thus producing better and more accurate resolution.

Further, the apparatus is not limited to carburetor testing, but can be employed for other similar testing involving control of the ratio of fluid mixtures.

While but one embodiment of the invention has been shown and described for purposes of illustration, it is apparent that modifications may be possible within the scope of the appended claims.

What I claim as my invention is:

1. Test apparatus for determining fluid flow characteristics for a test structure for dispensing at least two fluids in a prescribed relationship to each other and having a discharge orifice of an adjustably determined variable effective area, comprising a first chamber having a first inlet and a first outlet, a second chamber having a second inlet and a second outlet, first conduit means generally interconnecting said first and second outlets, second conduit means communicating between said first conduit means and said fluid pump situated downstream thereof, said pump being effective for creating a first subatmospheric pressure of one of said fluids in said first conduit means and second subatmospheric pressures of said one of said fluids of greater absolute pressure values than said first subatmospheric pressure in said first and second chambers, first restricted orifice means of constant area situated in series relationship with said first chamber and said first conduit means so as to restrict the otherwise unrestricted flow of at least said one fluid from said first chamber to said first conduit means, second restricted orifice means of constant area situated in series relationship with said second chamber and said first conduit means so as to restrict the otherwise unrestricted flow of said one fluid from said second chamber to said first conduit means, a master reference member having third restrictive orifice means of constant area formed therein, said master reference member being adapted to be situated with respect to said second chamber so as to place said third restrictive orifice means in series relationship with said second chamber in order to restrict the otherwise unrestricted flow of said one fluid into said second chamber, means for situating said test structure with respect to said first inlet of said first chamber so as to place said discharge orifice in series relationship with said first chamber so as to restrict the otherwise unrestricted flow of at least said one fluid into said first chamber, first means for indicating when said second subatmospheric pressures within said first and second chambers are substantially equal to each other, a source for another fluid of said at least two fluids, means for supplying a flow of said other fluid to said test structure when said indicating means indicates that said second subatmospheric pressures are substantially equal to each other, and additional means for indicating if the rate of flow of said other fluid is within predetermined limits established for the value of the then existing said second subatmospheric pressures.

2. Test apparatus according to claim 1 wherein said master reference member includes a plurality of additional restrictive orifice means of constant area, said additional restrictive orifice means being selectively employed in place of said third restrictive orifice means for conditions wherein said pump creates second subatmospheric pressures of values different than that when said third restrictive orifice means is employed as a reference.

3. Test apparatus according to claim 1 including valving means interposed between said first and second outlets and said fluid pump in order to regulate the said first subatmospheric pressure created by said pump.

4. Test apparatus according to claim 1 wherein said fluid pump comprises a vacuum pump, wherein said one fluid comprises atmospheric air, wherein said other fluid comprises simulated fluid fuel, wherein said orifice of an adjustably determined variable effective area comprises an induction passage of a carburetor with a variably positioned throttle valve situated therein, and wherein said third restrictive orifice means is of a size so as to function as a sonic nozzle when said second subatmospheric pressure is created in said second chamber.

5. Test apparatus according to claim 1 wherein said indicating means comprises a manometer having one of its ends in communication with said first chamber and another of its ends in communication with said second chamber, and including additional pressure responsive means for indicating when a selected value of said second subatmospheric pressure has been attained in said first chamber.

6. Test apparatus according to claim 1 wherein said additional means for indicating said rate of flow of said other fluid comprises a rotameter.

7. Test apparatus according to claim 1 wherein said fluid pump comprises a vacuum pump, wherein said one fluid comprises atmospheric air, wherein said other fluid comprises simulated fluid fuel, wherein said orifice of an adjustably determined variable effective area comprises an induction passage of a carburetor with a variably positioned throttle valve situated therein, wherein said third restrictive orifice means is of a size so as to function as a sonic nozzle when said second subatmospheric pressure is created in said second chamber, wherein said indicating means comprises a manometer having one of its ends in communication with said first chamber and another of its ends in communication with said second chamber, wherein said additional means for indicating said rate of flow of said other fluid comprises a rotameter, including valving means interposed between said first and second outlets and said vacuum pump in order to regulate the said first subatmospheric pressure created by said pump, and including additional pressure responsive means for indicating when a selected value of said second subatmospheric pressure has been attained in said first chamber.

8. A method of testing a carburetor, having an induction passage therethrough with a throttle valve situated therein for controlling flow from the inlet to the outlet of said induction passage, for an internal combustion engine in order to determine whether the rate of flow of fuel from the said outlet is within the range of predetermined prescribed limits for a predetermined pressure differential across said throttle valve, said method comprising:
(a) exposing one side of a master gauging orifice to a first atmospheric pressure;
(b) exposing said carburetor inlet to said first atmospheric pressure;
(c) exposing the other side of said master gauging orifice to a source of subatmospheric pressure thereby applying thereto a second pressure of a value which will result in the establishment of said predetermined pressure differential across said gauging orifice and create in accordance therewith a first pneumatic flow through said orifice;
(d) exposing said carburetor outlet to said source of subatmospheric pressure in branch circuit relationship to said gauging orifice and said first pneumatic flow in order to apply to said outlet a third pressure of a value less than said first atmospheric pressure so as to create in accordance therewith a second pneumatic flow through said induction passage;
(e) creating a second pressure differential across said throttle valve by restricting the second pneumatic flow through said induction passage by adjusting the position of the throttle valve until the values of said second and third pressures are equal to each other;
(f) exposing a source of fuel-simulating fluid to said second pressure differential in order to create and direct a rate of flow of said fluid into said second pneumatic flow; and
(g) gauging the rate of flow of said fuel-simulating fluid so created and directed to said second pneumatic flow in order to determine whether said rate is within the said range of predetermined prescribed limits.

References Cited

UNITED STATES PATENTS 2,293,725 8/1942 Fiock et al. _____ 73—3
2,597,231 5/1952 Edelen _____ 73—118
2,790,320 4/1957 Salko et al. _____ 73—196 X RICHARD C. QUEISSER, *Primary Examiner.*

JERRY W. MYRACLE, *Assistant Examiner.*

U.S. Cl. X.R.

73—3